US009885880B2

(12) United States Patent
Hu et al.

(10) Patent No.: US 9,885,880 B2
(45) Date of Patent: Feb. 6, 2018

(54) LENS DRIVING APPARATUS WITH CLOSED-LOOP ANTI-SHAKE STRUCTURE

(71) Applicant: TDK TAIWAN CORP., Yangmei, Taoyuan County (TW)

(72) Inventors: Chao-Chang Hu, Yangmei (TW); Shu-Shan Chen, Yangmei (TW); Cheng-Kai Yu, Yangmei (TW); Bing-Ru Song, Yangmei (TW)

(73) Assignee: TDK TAIWAN CORP., Yangmei (TW)

( * ) Notice: Subject to any disclaimer, the term of this patent is extended or adjusted under 35 U.S.C. 154(b) by 71 days.

(21) Appl. No.: 15/086,202

(22) Filed: Mar. 31, 2016

(65) Prior Publication Data
US 2016/0299350 A1    Oct. 13, 2016

(30) Foreign Application Priority Data

Apr. 8, 2015  (TW) .............................. 104111222 A

(51) Int. Cl.
| | | |
|---|---|---|
| *G02B 27/64* | (2006.01) | |
| *G03B 5/02* | (2006.01) | |
| *G02B 7/10* | (2006.01) | |
| *H04N 5/232* | (2006.01) | |
| *G03B 3/10* | (2006.01) | |

(52) U.S. Cl.
CPC ............. *G02B 27/646* (2013.01); *G02B 7/10* (2013.01); *G03B 5/02* (2013.01); *G03B 3/10* (2013.01); *G03B 2205/0015* (2013.01); *G03B 2205/0069* (2013.01); *H04N 5/23287* (2013.01)

(58) Field of Classification Search
CPC ........... H04N 5/23248; H04N 5/23264; H04N 5/2328; H04N 5/23287; G02B 27/64; G02B 27/646; G02B 7/04

USPC ....... 359/554, 557; 250/201.1, 201.2, 201.4; 348/208.99, 208.2, 208.12; 396/52, 55

See application file for complete search history.

(56) References Cited

U.S. PATENT DOCUMENTS

| | | | | |
|---|---|---|---|---|
| 2012/0154614 | A1* | 6/2012 | Moriya ................ | G03B 3/10 348/208.5 |
| 2013/0258475 | A1* | 10/2013 | Lee .................... | G02B 7/102 359/554 |
| 2014/0333784 | A1* | 11/2014 | Hu ..................... | G02B 27/646 348/208.2 |

FOREIGN PATENT DOCUMENTS

WO        2009133691 A1    11/2009

* cited by examiner

*Primary Examiner* — Arnel C Lavarias
(74) *Attorney, Agent, or Firm* — Locke Lord LLP; Tim Tingkang Xia, Esq.

(57) ABSTRACT

A lens driving apparatus with a closed-loop anti-shake structure, including: a lens holder comprising a coil; a frame comprising a plurality of magnets and receiving the lens holder; a driving circuit board comprising a plurality of coils corresponding to the plurality of magnets and disposed under the frame; a plurality of first set of elastic bodies configured such that the lens holder remains movable in a direction of a first axis with respect to the frame; a plurality of second set of elastic bodies configured such that the frame remains movable in a direction perpendicular to the first axis with respect to the driving circuit board; and a first optical module and a first optical reference respectively disposed at the driving circuit board and the lens holder, the first optical module sensing a relative movement of the first optical reference so as to sense a movement of the lens holder in the direction of the first axis.

16 Claims, 8 Drawing Sheets

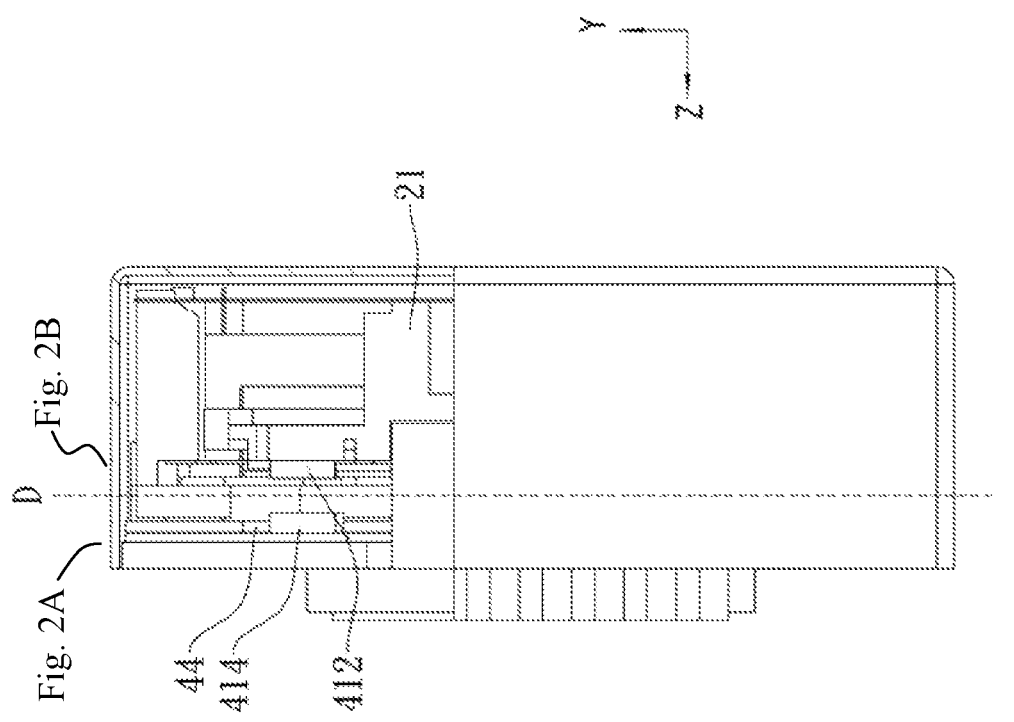

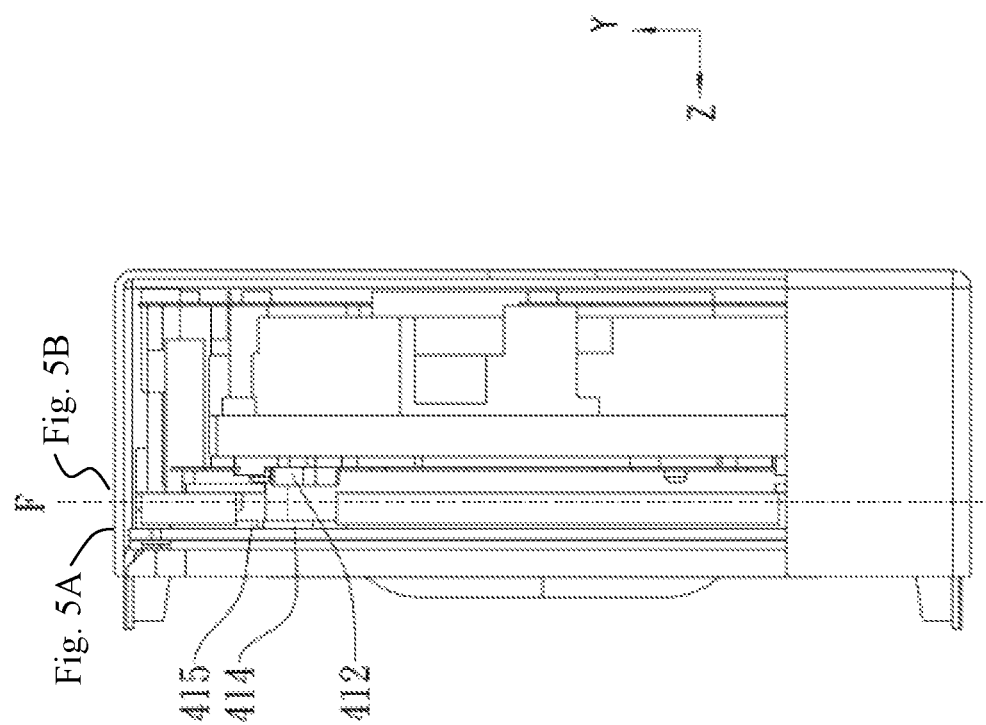

LENS DRIVING APPARATUS WITH CLOSED-LOOP ANTI-SHAKE STRUCTURE

RELATED APPLICATIONS

This application claims priority to Taiwan Application Serial Number 104111222, filed on Apr. 8, 2015, which is incorporated by reference herein in its entirety.

BACKGROUND

Technical Field

The present invention relates to a closed-loop anti-shake structure, and more particularly, to a closed-loop anti-shake structure applicable to lens driving apparatuses.

Description of Related Art

With the advancement in technology, camera devices are more and more popular. However, as the camera device is often operated without being secured with a tripod, the shutter speed may be below a safe level under insufficient lighting, thus when the shutter is pressed, blurry images may be produced easily due to various kinds of shakes.

Electronic and optical compensation methods are two main anti-shake methods used in the existing camera devices. The electronic compensation method utilizes an electronic system of a camera device to control the capturing of images, employs an algorithm to restore images, or involves selection of the clearest image among several continuously shot images. The optical compensation method involves moving an optical lens module or a light sensing module to perform the compensation operation so as to offset the shake of the camera and thereby to maintain the stability of the camera's optical system.

With an increasing demand for good image quality and functionality, a camera device's anti-shake system can be influenced by an ambient magnetic field easily when a Hall sensor is adopted to perform the image compensation operation. Moreover, the conduction of the electric circuit is required when the Hall sensor is used for anti-shake control in the direction of the ray axis, resulting in increased manufacturing and development costs. All manufacturers have a common objective of developing a lens driving apparatus with a closed-loop anti-shake structure that is capable of reducing magnetic field interference and costs.

SUMMARY

In view of the aforementioned problems in the prior art, an object of the present invention is to provide an anti-shake structure, and more particularly, a structure utilizing an optical module and an optical reference to realize the closed-loop anti-shake function.

One concept of the present invention is to provide a lens driving apparatus with a closed-loop anti-shake structure, comprising: a lens holder comprising a coil; a frame comprising a plurality of magnets and receiving the lens holder; a driving circuit board comprising a plurality of coils corresponding to the plurality of magnets and disposed under the frame; a plurality of first set of elastic bodies configured such that the lens holder remains movable in a direction of a first axis with respect to the frame; a plurality of second set of elastic bodies configured such that the frame remains movable in a direction perpendicular to the first axis with respect to the driving circuit board; and a first optical module and a first optical reference respectively disposed at the driving circuit board and the lens holder, the first optical module sensing a relative movement of the first optical reference so as to sense a movement of the lens holder in the direction of the first axis.

According to the foregoing concept, the first optical module is disposed on a surface of the driving circuit board which faces a bottom surface of the lens holder on which the first optical reference is disposed. Moreover, the first optical module is configured to sense a distance between itself and the first optical reference so as to sense the movement of the lens holder in the direction of the first axis. The first optical module comprises a light source and a light intensity sensor, and the first optical reference is a reflection mirror that reflects the light source's light to the light intensity sensor.

According to the foregoing concept, the lens driving apparatus further comprises a plurality of Hall sensors disposed on the driving circuit board to sense a movement of the frame in the direction perpendicular to the first axis. Preferably, the lens driving apparatus further comprises a second optical module, a second optical reference, a third optical module and a third optical reference, wherein each of the second optical module and the third optical module comprises a light source and a light intensity sensor, and each of the second optical reference and the third optical reference is a reflection mirror that reflects the light source's light to the light intensity sensor. Preferably, each of the second optical module and the third optical module comprises a light source and an optical phase sensor, and each of the second optical reference and the third optical reference is a reflection grating that reflects the light source's light to the optical phase sensor.

Another concept of the present invention is to provide a lens driving apparatus with a closed-loop anti-shake structure, comprising: a lens holder comprising a coil; a frame comprising a plurality of magnets and receiving the lens holder; a driving circuit board comprising a plurality of coils corresponding to the plurality of magnets and disposed under the frame; a plurality of first set of elastic bodies configured such that the lens holder remains movable in a direction of a first axis with respect to the frame; a plurality of second set of elastic bodies configured such that the frame remains movable in a direction perpendicular to the first axis with respect to the driving circuit board; and a second optical module and a third optical module disposed at the driving circuit board, and a second optical reference and a third optical reference disposed at the frame, the second optical module sensing a relative movement of the second optical reference and the third optical module sensing a relative movement of the third optical reference so as to sense a movement of the frame in the direction perpendicular to the first axis.

According to the foregoing concept, the lens driving apparatus further comprises a second optical module, a second optical reference, a third optical module and a third optical reference, wherein each of the second optical module and the third optical module comprises a light source and a light intensity sensor, and each of the second optical reference and the third optical reference is a reflection mirror that reflects the light source's light to the light intensity sensor. Preferably, each of the second optical module and the third optical module comprises a light source and an optical phase sensor, and each of the second optical reference and the third optical reference is a reflection grating that reflects the light source's light to the optical phase sensor.

According to the foregoing concept, the lens driving apparatus further comprises a Hall sensor disposed on the lens holder to sense a movement of the lens holder in the direction of the first axis. Preferably, the first optical module comprises a light source and a light intensity sensor or an optical phase sensor, and the first optical reference is a reflection mirror that reflects the light source's light to the light intensity sensor or a reflection grating that reflects the light source's light to the optical phase sensor.

The foregoing aspects and other aspects of the present invention will be fully described with exemplary embodiments below by reference to the appended drawings.

BRIEF DESCRIPTION OF THE DRAWINGS

FIG. 3 is a section view taken along a tangential plane C in FIG. 2 in accordance with the first embodiment of the present invention.

FIG. 6 is a section view taken along a tangential plane E in FIG. 5 in accordance with the second embodiment of the present invention.

DETAILED DESCRIPTION

Figure 1:
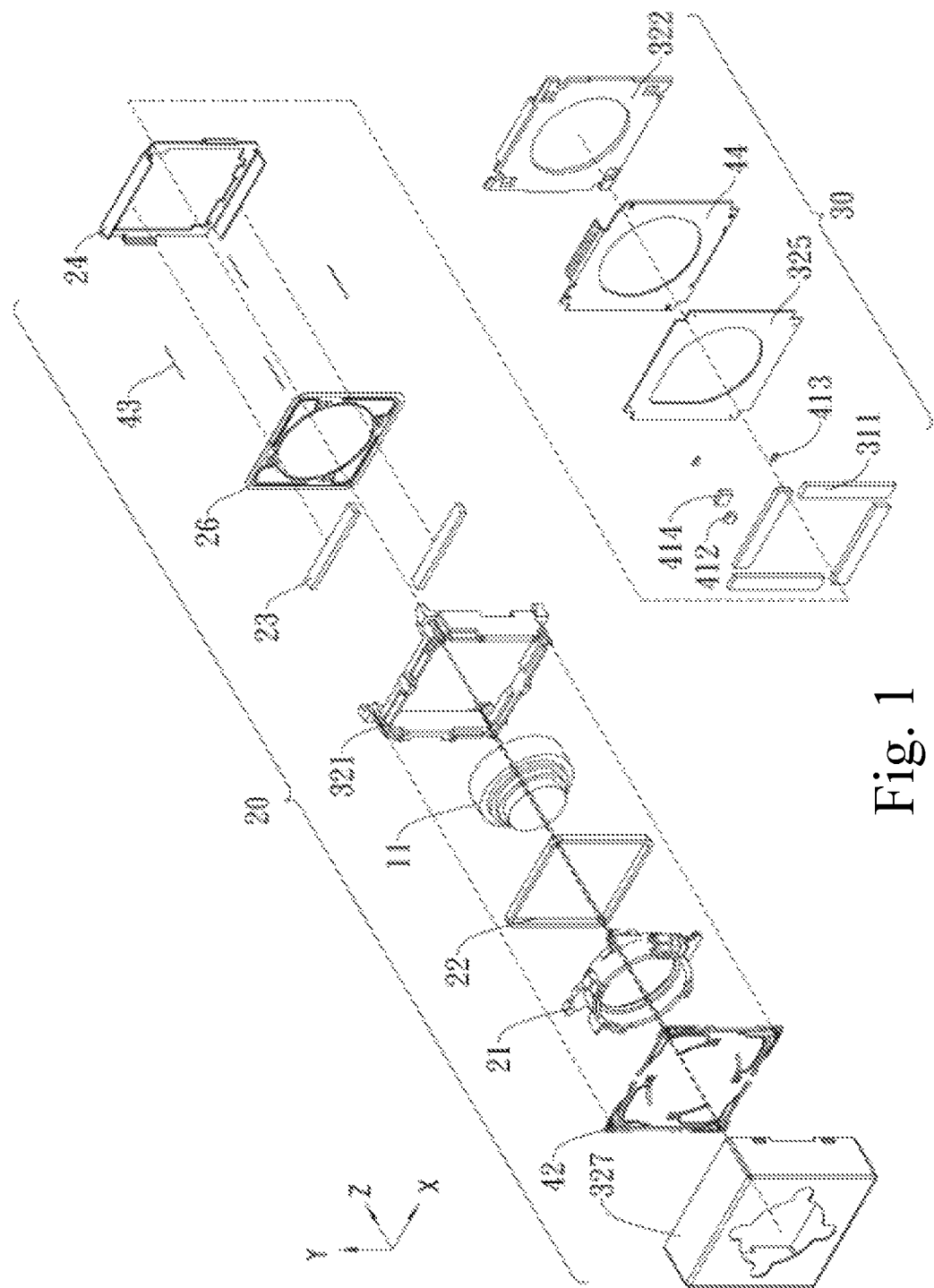
FIG. 1 is a perspective exploded view of a closed-loop anti-shake structure in accordance with a first embodiment of the present invention.

The present invention will be fully described by way of preferred embodiments and appended drawings to facilitate the understanding of the technical features, contents and advantages of the present invention and the effect to be achieved by the present invention. It will be understood that the appended drawings are merely schematic representations and may not be illustrated according to actual scale and precise arrangement of the implemented invention. Therefore, the scope of protection of the present invention shall not be construed based on the scale and arrangement illustrated in the appended drawings and limited thereto.

The embodiments of the present invention will be described by reference to the appended drawings. It is to be noted that the components in the drawings are schematically illustrated for clearly describing the present invention and are not drawn with intent to show actual size and scale. Moreover, certain drawings are simplified by omitting conventional components so as to facilitate the understanding of the present invention.

FIG. 1 is a perspective exploded view of a closed-loop anti-shake structure in accordance with a first embodiment of the present invention. In the first embodiment of the present invention, the closed-loop anti-shake structure at least comprises an external frame 327, an optical autofocus module 20, an image stabilization module 30 and an image sensing element (not shown), wherein the optical autofocus module 20, the image stabilization module 30 and the image sensing element (not shown) are all arranged in a direction of a ray axis.

The optical autofocus module 20 carries a lens 11 and performs the auto-focusing operation along the ray axis (z axis, the first axis) so that an image is focused on the image sensing element (not shown); the image stabilization module 30 performs the image compensation operation in the direction of the ray axis and a direction perpendicular to the ray axis (x axis or y axis).

Preferably, the optical autofocus module 20 is a voice coil motor (VCM) driving structure comprising: a lens holder 21 comprising a coil and configured to carry the lens 11; a Z-axis driving electromagnetic element 22 (preferably, a coil) arranged around an exterior of the lens holder 21; a frame 321 in which the lens holder 21 is disposed; an upper spring plate 42 and a lower spring plate 26 (the first set of elastic bodies) elastically retaining the lens holder 21 with respective movable inner circles thereof and configured such that the lens holder 21 remains movable in the Z-axis direction with respect to the frame 321; and a Z-axis driving magnetic element 23 disposed on a yoke 24, which is positioned within the frame 321 so that the Z-axis driving magnetic element 23 corresponds to the Z-axis driving electromagnetic element 22.

The image stabilization module 30 is provided with a plurality of suspension wires 43 (the second set of elastic bodies). The plurality of suspension wires 43 are made of a flexible wire material and are electrically conductive. Preferably, there are four suspension wires whose one ends are connected to areas in proximity to four corners of the upper spring plate 42 and whose the other ends are connected to a driving circuit board 44 so that the optical autofocus module 20 is suspended above the image stabilization module 30, thereby the frame 321 remains movable in the X-axis direction and the Y-axis direction perpendicular to the Z-axis direction with respect to the driving circuit board 44. A sensing element support 322 of the image stabilization module 30 is configured to secure the driving circuit board 44 on the image sensing element.

Figure 2B:
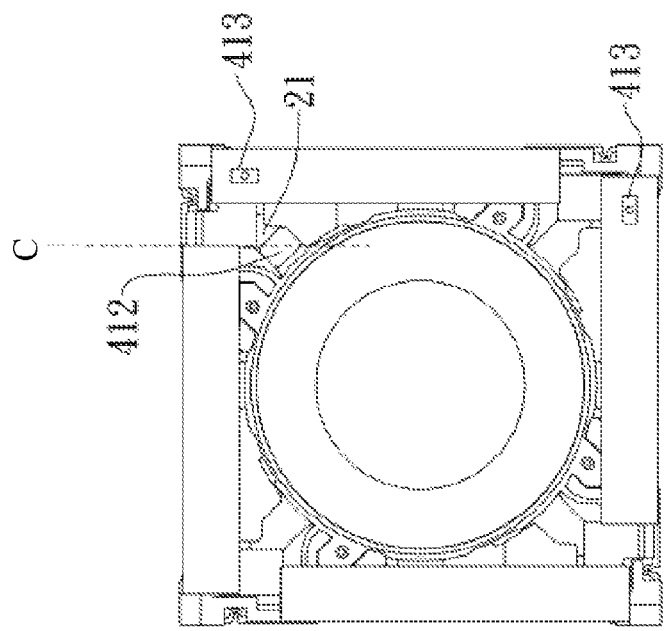
FIG. 2A and FIG. 2B are schematic views showing the positions of the sensor and the reflector in accordance with the first embodiment of the present invention.
Figure 2A:
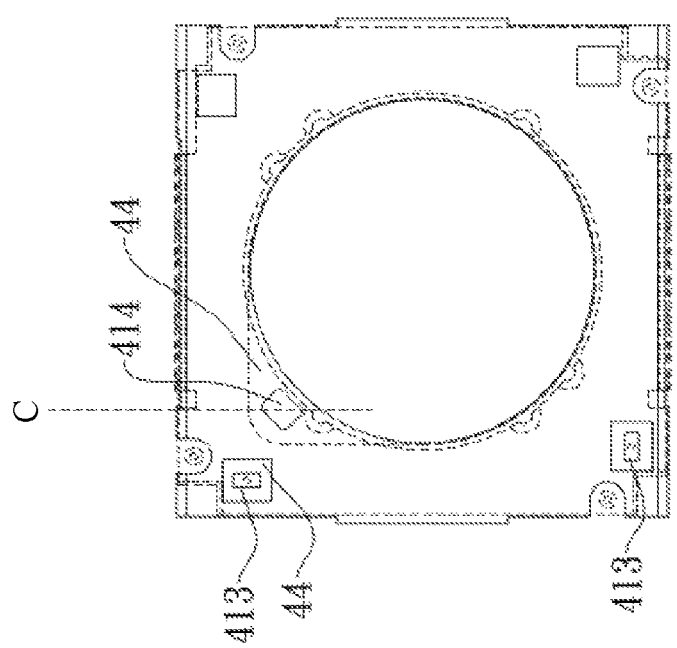

FIGS. 2A and 2B are schematic views showing the positions of the sensor and the reflector, and FIG. 3 is a section view taken along a tangential plane C in FIG. 2 in accordance with a first embodiment of the present invention. FIG. 2A and FIG. 2B are section views taken along a tangential plane D in FIG. 3. The image stabilization module 30 employs X-axis and Y-axis Hall sensors 413 disposed on the driving circuit board 44 to sense the amounts of displacement in the X-axis direction and Y-axis direction. The driving circuit board 44 receives the amounts of displacement in the X-axis direction and Y-axis direction and electrically drives a X-axis and Y-axis driving plate coil 325 to generate an electromagnetic field and thereby to drive X-axis and Y-axis magnets 311 to move in the X-axis direction or Y-axis direction to compensate an instantaneous displacement of the optical autofocus module 20 in the X-axis or Y-axis direction, thereby achieving closed-loop anti-shake control in the X-axis and Y-axis directions.

When the optical autofocus module 20 performs the auto-focusing operation, a Z-axis light intensity sensor 414 (the first optical module) disposed on the driving circuit board 44 senses a relative movement of a Z-axis reflection mirror 412 (the first optical reference) disposed on the lens holder 21 to sense a movement of the lens holder 21 in the Z-axis direction so as to compensate the amount of instantaneous displacement in the Z-axis direction, thereby achieving closed-loop anti-shake control in the Z-axis direction.

The Z-axis light intensity sensor 414 functions by emitting an optical signal toward the Z-axis reflection mirror 412 and receiving the intensity of the reflected optical signal to calculate a displaced position for the reflection mirror 412 when the Z-axis reflection mirror 412 moves in a direction perpendicular to the Z-axis light intensity sensor 414, provided, however, that the distance variation of the Z-axis reflection mirror 412 occurs in a direction perpendicular to the Z-axis light intensity sensor 414. While there is no restriction on the position where the Z-axis light intensity sensor 414 is installed, the Z-axis light intensity sensor 414 must face the Z-axis reflection mirror 412, and both the Z-axis light intensity sensor 414 and the Z-axis reflection mirror 412 should be perpendicular to the operational direction. However, in the first embodiment, the X-axis and Y-axis magnets 311 are arranged in a rotational manner and angled with respect to one another at 90 degrees, thus it is more likely that space will be spared at the 45 degree angle for the Z-axis light intensity sensor 414. In other embodiments, when the X-axis and Y-axis magnets are arranged in a rotational manner and angled with respect to one another at 45 degrees, it is more likely that space will be spared at the 90 degree angle for the Z-axis light intensity sensor. When the lens driving apparatus has a larger size, the position where the Z-axis light intensity sensor is installed is not restricted.

In the first embodiment of the present invention, X-axis, Y-axis and Z-axis sensors are all disposed on the driving circuit board 44 so that no additional signal deriving mechanism is required for the sensing operation in the Z-axis direction, and consequently the cost can be reduced. Moreover, as all signals are derived from the driving circuit board 44, the movable portion is not restricted by the derivation of sensor signals, thereby the degree of difficulty in design can be reduced. Furthermore, the transmission distance is shortened, thus signal loss is less likely to occur, thereby reducing signal noises.

Figure 4:
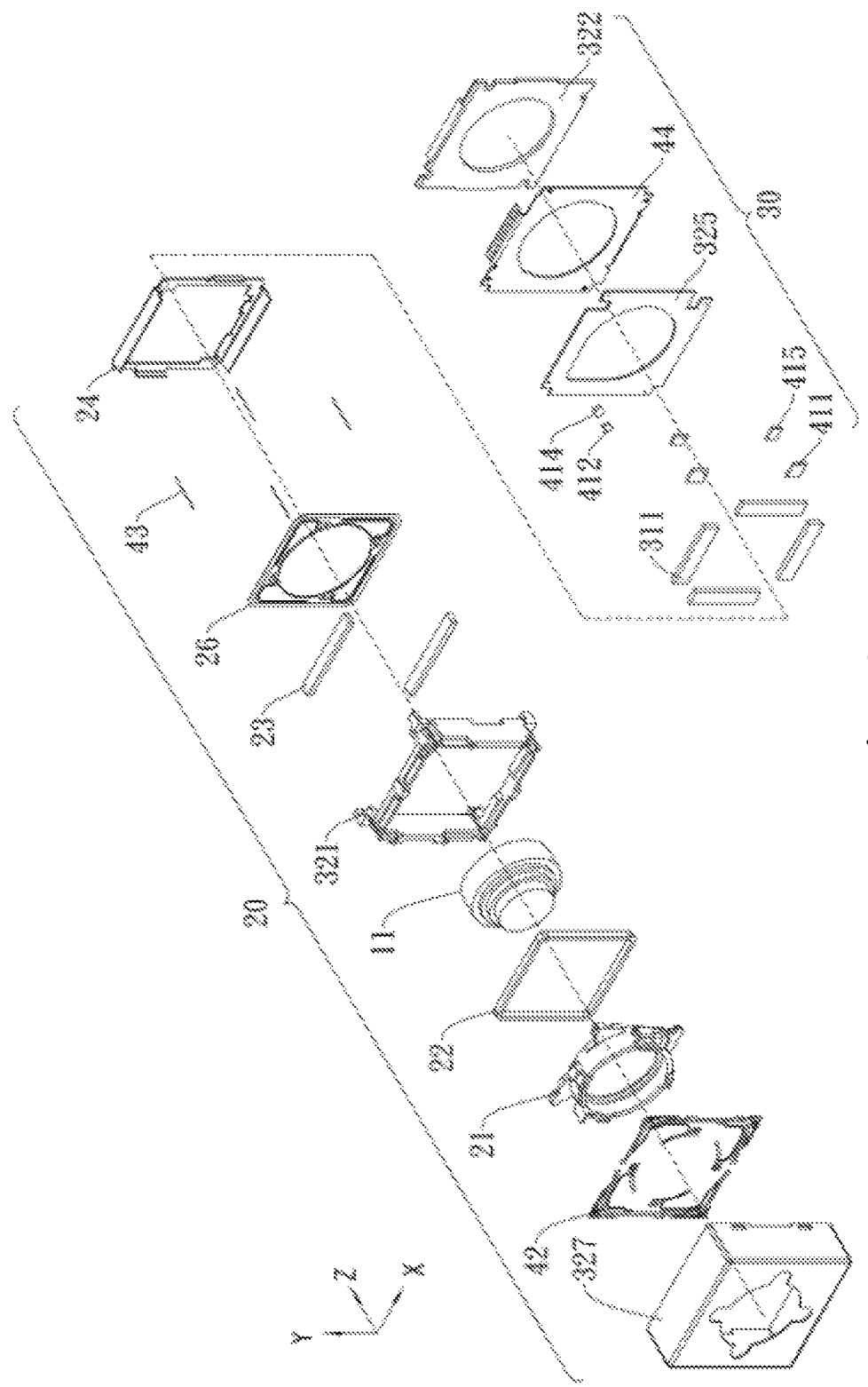
FIG. 4 is a perspective exploded view of a closed-loop anti-shake structure in accordance with a second embodiment of the present invention.

FIG. 4 is a perspective exploded view of a closed-loop anti-shake structure in accordance with a second embodiment of the present invention. The closed-loop anti-shake structure of the second embodiment is different from the one described in the first embodiment in the types of X-axis and Y-axis sensors and reflectors while the Z-axis sensor and reflector (a light intensity sensor and a reflection mirror) and the rest of its components are the same as those of the first embodiment.

Figures 5A, 5B:
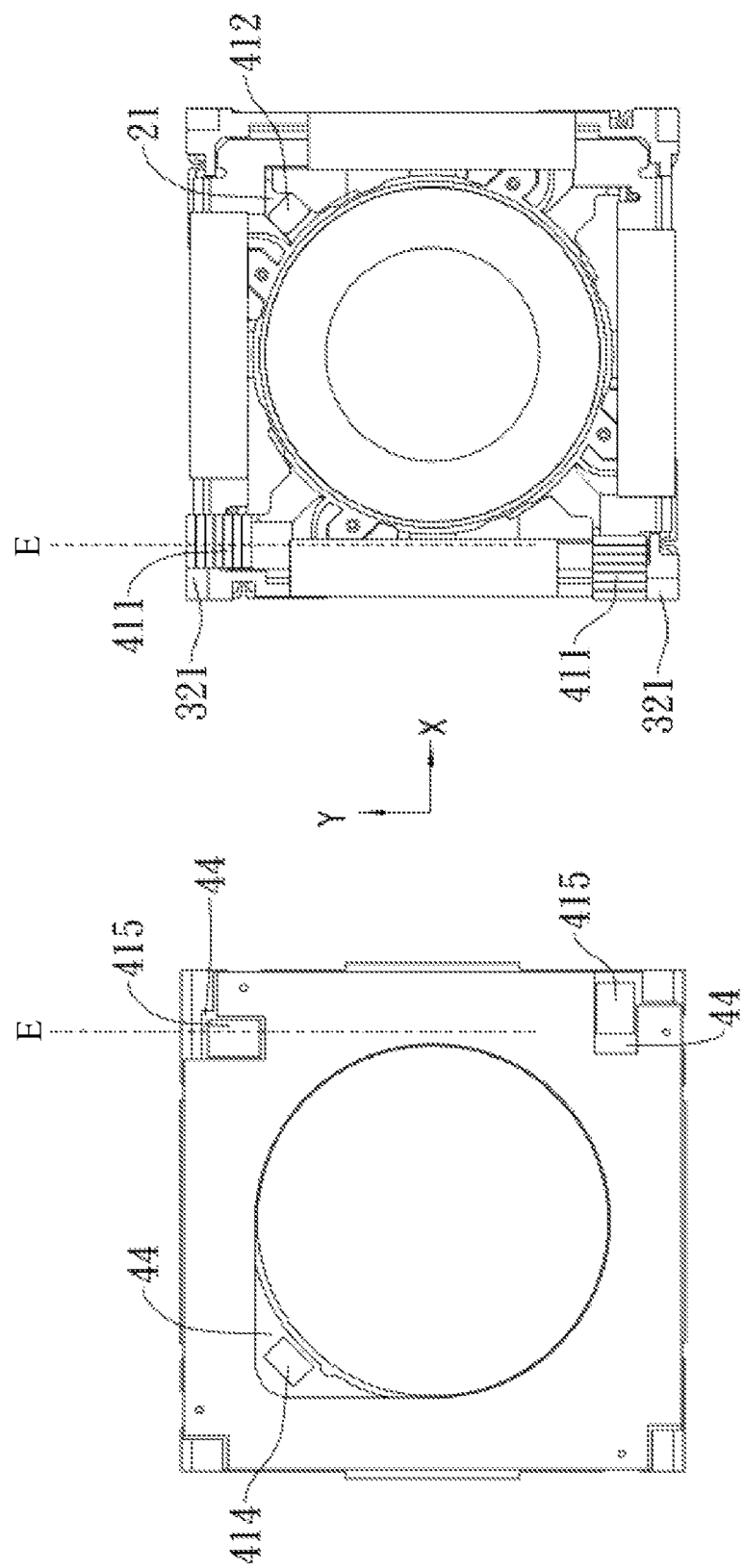
FIG. 5A and FIG. 5B are schematic views showing the positions of the sensor and the reflector in accordance with the second embodiment of the present invention.

FIG. 5A and FIG. 5B are schematic views showing the positions of the sensors and reflectors and FIG. 6 is a section view taken along a tangential plane E in FIG. 5 in accordance with the second embodiment of the present invention. FIG. 5A and FIG. 5B are section views taken along a tangential plane F in FIG. 6. An image stabilization module 30 employs X-axis and Y-axis optical phase sensors 415 (the second optical module and the third optical module) disposed on the driving circuit board 44 to sense relative movements of X-axis and Y-axis reflection gratings 411 (the second optical reference and the third optical reference) so as to sense movements of a frame 321 in the X-axis and Y-axis directions and to compensate the amounts of instantaneous displacement in the X-axis and Y-axis directions, thereby achieving closed-loop anti-shake control in the X-axis and Y-axis directions.

The X-axis and Y-axis optical phase sensors 415 function by emitting optical signals toward the X-axis and Y-axis reflection gratings 411 and calculating displaced positions of the X-axis and Y-axis reflection gratings 411 based on phase shifts in the optical signals reflected by the light incident to the displaced X-axis and Y-axis reflection gratings 411, provided, however, that the distance variation of the X-axis and Y-axis reflection gratings 411 occurs in directions parallel to the X-axis and Y-axis optical phase sensors 415.

The X-axis, Y-axis and Z-axis sensors of the second embodiment are all disposed on the driving circuit board 44 so that no additional signal deriving mechanism is required for the sensing operation in the Z-axis direction, and consequently the cost can be reduced. Moreover, as all signals are derived from the driving circuit board 44, the movable portion is not restricted by the derivation of sensor signals, thereby the degree of difficulty in design can be reduced. Furthermore, the transmission distance is shortened so that signal loss is less likely to occur, thereby reducing signal noises. In the second embodiment of the present invention, the use of optical phase sensors in the X-axis and Y-axis directions and the light intensity sensor in the Z-axis direction can reduce the Hall sensor's sensing errors caused by an ambient magnetic field.

Figure 7:
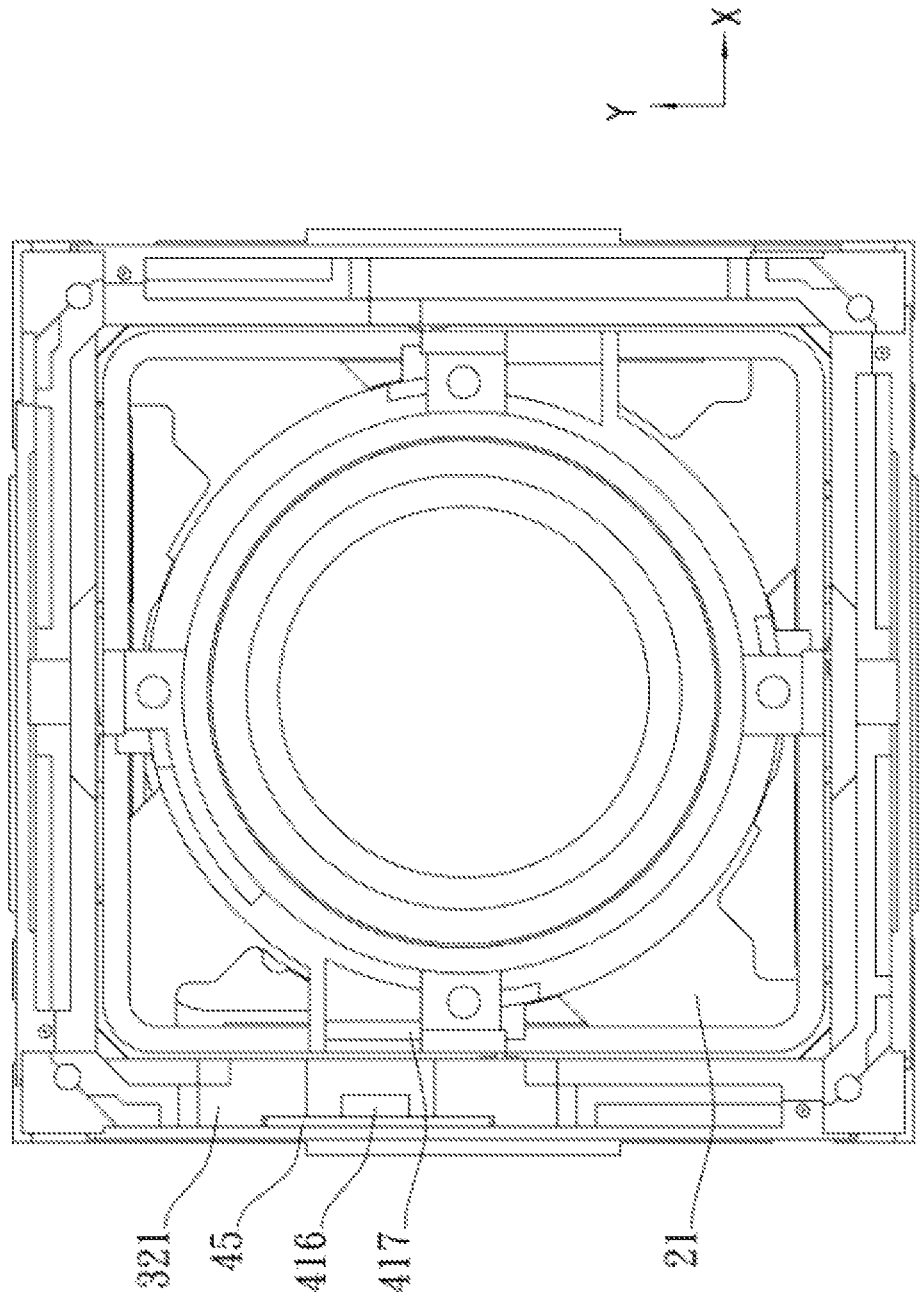
FIG. 7 is a positional view in accordance with a third embodiment of the present invention.

FIG. 7 is a positional view in accordance with a third embodiment of the present invention. The closed-loop anti-shake structure of the third embodiment is different from the one described in the second embodiment in the types of Z-axis sensor and reflector while the X-axis and Y-axis sensors and reflectors (the optical phase sensors and reflection gratings) and the rest of its components are the same as those of the second embodiment.

In the third embodiment of the present invention, a Z-axis optical phase sensor 416 (the first optical module) is disposed on a frame 321, and a Z-axis reflection grating 417 (the first optical reference) is disposed on a surface of the lens holder 21 opposite thereto. When an optical autofocus module 20 performs the auto-focusing operation, the Z-axis optical phase sensor 416 emits an optical signal toward the Z-axis reflection grating 417 and senses a phase shift in the optical signal reflected by the incident light to calculate the displaced position so as to compensate the amount of instantaneous displacement in the Z-axis direction, thereby achieving closed-loop anti-shake control in the Z-axis direction.

In the third embodiment, the use of optical phase sensors in the X-axis, Y-axis and Z-axis directions can reduce the Hall sensor's sensing errors caused by an ambient magnetic field. The sensing signals of the Z-axis optical phase sensor 416 can be received by a driving circuit board 45 on the frame 321, transmitted to suspension wires via spring plates or a 3D circuit disposed on the frame 321, and then conducted to the driving circuit board 44.

Figure 8:
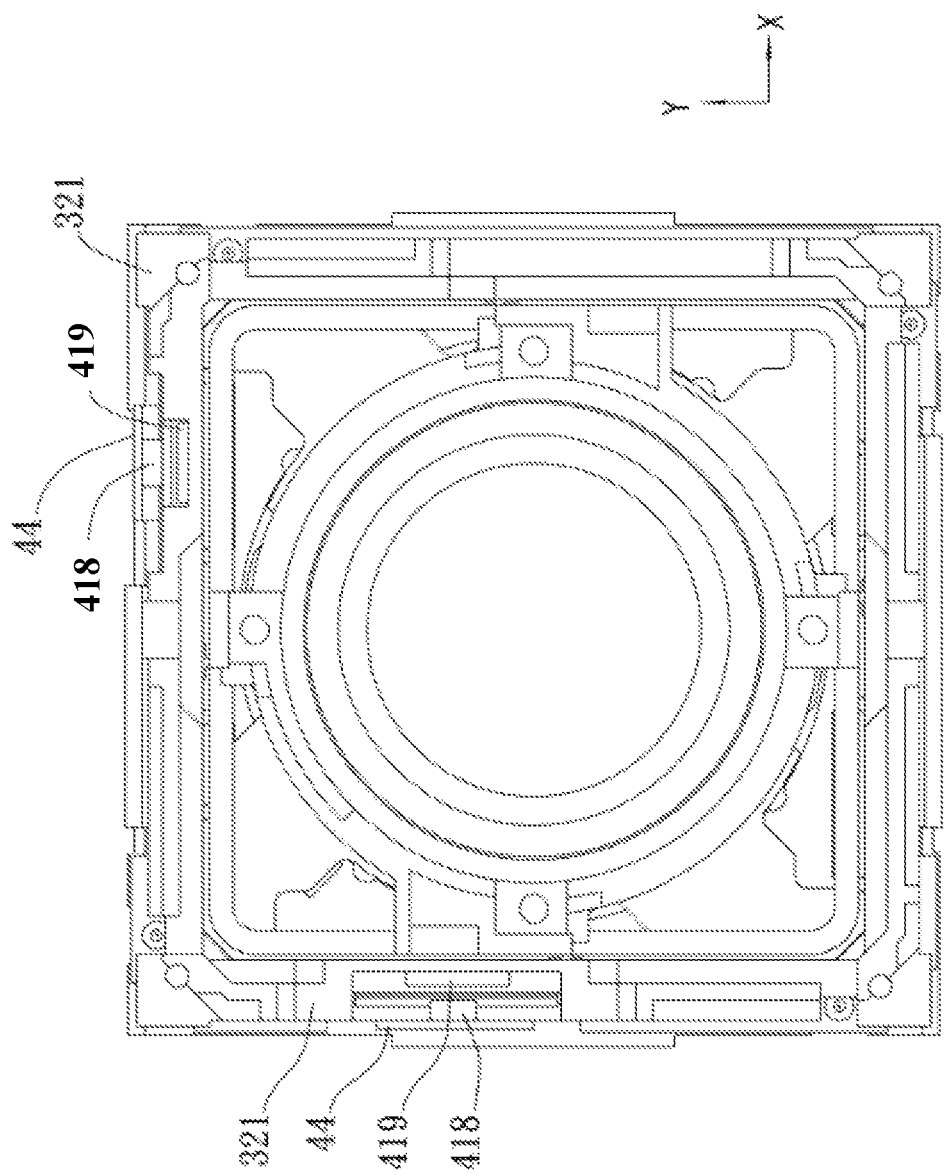
FIG. 8 is a positional view in accordance with a fourth embodiment of the present invention.

FIG. 8 is a positional view in accordance with a fourth embodiment of the present invention. The closed-loop anti-shake structure of the fourth embodiment is different from the one described in the second embodiment in the types of X-axis and Y-axis sensors and reflectors while the Z-axis sensor and reflector (the light intensity sensor and the reflection mirror) and the rest of its components are the same as those of the second embodiment.

In the fourth embodiment, X-axis and Y-axis light intensity sensors 418 (the second optical module and the third optical module) are disposed on a surface of a driving circuit board 44 which is parallel to Z-axis direction, and X-axis and Y-axis reflection mirrors 419 (the second optical reference and the third optical reference) are disposed on the side surface of the frame 321 which is parallel to Z-axis direction. The X-axis and Y-axis light intensity sensors 418 sense the distances between themselves and the X-axis and Y-axis reflection mirrors 419 so as to sense movements of the frame 321 in the X-axis and Y-axis directions and to compensate the amounts of instantaneous displacement in the X-axis and Y-axis directions, thereby achieving closed-loop anti-shake control in the X-axis and Y-axis directions.

In the fourth embodiment of the present invention, the use of light intensity sensors in the X-axis, Y-axis and Z-axis directions can reduce the Hall sensor's sensing errors caused by an ambient magnetic field.

To sum up, the closed-loop anti-shake structure of the present invention utilizes a combination of optical phase sensors and light intensity sensors to perform the anti-shake compensation in the X-axis, Y-axis and Z-axis directions so that the sensing errors caused by an ambient magnetic field can be reduced and thereby to exempt the restriction on the installation of components, which will cause magnetic-interference, in proximity to the lens driving apparatus. Moreover, the use of a light intensity sensor in the Z-axis direction exempts the need to install additional signal deriving mechanism for the sensing operation in the Z-axis direction, and consequently the cost can be reduced. Furthermore, as all signals are derived from the driving circuit board 44, the movable portion is not restricted by the derivation of sensor signals, thereby the degree of difficulty in design can be reduced. In addition, the transmission distance is shortened so that signal loss is less likely to occur, thereby reducing signal noises.

Regarding the closed-loop anti-shake structure of the present invention, the types of sensors arranged in the X-axis, Y-axis and Z-axis directions are not limited to those described in the embodiments. For example, the present invention can arrange light intensity sensors in the X-axis and Y-axis directions and an optical phase sensor in the Z-axis direction. The closed-loop anti-shake structure of the present invention can also be implemented in combination with the prior art techniques. For example, Hall sensors are arranged in the X-axis and Y-axis directions while an optical phase sensor is arranged in the Z-axis direction. Alternatively, a Hall sensor is arranged in the Z-axis direction and any types of light sensors are arranged in the X-axis and Y-axis directions. The sensors arranged in the X-axis and Y-axis directions are not required to be of the same type, and different types of sensors may be used according to needs. The types of sensors arranged in the X-axis, Y-axis and Z-axis directions and implementation thereof have been described above, and a person skilled in the art can make any change, modification or equivalent alteration to the type(s) of sensors arranged in the X-axis, Y-axis and Z-axis directions which still fall within the scope of protection of the present invention.

The preferred embodiments of the closed-loop anti-shake structure of the present invention have been described by reference to the appended drawings. All the features disclosed herein can be combined with other methods, and every feature disclosed herein can be optionally replaced with a feature with the same, equivalent or similar effect. Therefore, except for particularly distinct features, any feature disclosed herein is an example of identical or similar features. With the preferred embodiments described above, a person skilled in the art understands that the present invention possesses novelty, inventive step and practical applicability. Any modification to the present invention without departing from the scope of the claims can be made by a person skilled in the art.

What is claimed is:

1. A lens driving apparatus with a closed-loop anti-shake structure, comprising:
    a lens holder comprising a coil;
    a frame comprising a plurality of magnets and receiving the lens holder;
    a driving circuit board comprising a plurality of coils corresponding to the plurality of magnets and disposed under the frame;
    a plurality of first set of elastic bodies configured such that the lens holder remains movable in a direction of a first axis with respect to the frame;
    a plurality of second set of elastic bodies configured such that the frame remains movable in a direction perpendicular to the first axis with respect to the driving circuit board; and
    a first optical module and a first optical reference respectively disposed at the driving circuit board and the lens holder, the first optical module sensing a relative movement of the first optical reference so as to sense a movement of the lens holder in the direction of the first axis.

2. The lens driving apparatus of claim 1, wherein the first optical module and the first optical reference are arranged on respective surfaces of the driving circuit board and the lens holder which are opposite to each other, and the first optical module senses a distance between itself and the first optical reference so as to sense the movement of the lens holder in the direction of the first axis.

3. The lens driving apparatus of claim 2, wherein the first optical module comprises a light source and a light intensity sensor, and the first optical reference is a reflection mirror that reflects the light source's light to the light intensity sensor.

4. The lens driving apparatus of claim 2, wherein the first optical module is disposed on a surface of the driving circuit board which faces a bottom surface of the lens holder on which the first optical reference is disposed.

5. The lens driving apparatus of claim 2 further comprising a plurality of Hall sensors disposed on the driving circuit board and configured to sense a movement of the frame in the direction perpendicular to the first axis.

6. The lens driving apparatus of claim 1 further comprising a second optical module and a third optical module disposed at the driving circuit board, and a second optical reference and a third optical reference disposed at the frame, the second optical module sensing a relative movement of the second optical reference and the third optical module sensing a relative movement of the third optical reference so as to sense the movement of the frame in the direction perpendicular to the first axis.

7. The lens driving apparatus of claim 6, wherein each of the second optical module and the third optical module comprises a light source and an optical phase sensor, and each of the second optical reference and the third optical reference is a reflection grating that reflects the light source's light to the optical phase sensor.

8. The lens driving apparatus of claim 6, wherein the second optical reference and the third optical reference are disposed on surfaces of the frame opposite to the driving circuit board, and the second optical module senses a movement of the second optical reference in a plane perpendicular to the first axis and the third optical module senses a movement of the third optical reference in a plane perpendicular to the first axis so as to sense the movement of the frame in the direction perpendicular to the first axis.

9. The lens driving apparatus of claim 6, wherein the second optical module and the third optical module are disposed on a surface of the driving circuit board which is parallel to the first axis direction, the second optical reference and the third optical reference are disposed on the side surface of the frame which is parallel to the first axis direction, and the third optical module senses a distance between itself and the third optical reference and the second optical module senses a distance between itself and the second optical reference so as to sense the movement of the frame in the direction perpendicular to the first axis.

10. The lens driving apparatus of claim 6, wherein each of the second optical module and the third optical module comprises a light source and a light intensity sensor, and each of the second optical reference and the third optical reference is a reflection mirror that reflects the light source's light to the light intensity sensor.

11. A lens driving apparatus with a closed-loop anti-shake structure, comprising:
- a lens holder comprising a coil;
- a frame comprising a plurality of magnets and receiving the lens holder;
- a driving circuit board comprising a plurality of coils corresponding to the plurality of magnets and disposed under the frame;
- a plurality of first set of elastic bodies configured such that the lens holder remains movable in a direction of a first axis with respect to the frame;
- a plurality of second set of elastic bodies configured such that the frame remains movable in a direction perpendicular to the first axis with respect to the driving circuit board; and
- a second optical module and a third optical module disposed at the driving circuit board, and a second optical reference and a third optical reference disposed at the frame, the second optical module sensing a relative movement of the second optical reference and the third optical module sensing a relative movement of the third optical reference so as to sense a movement of the frame in the direction perpendicular to the first axis,
- wherein each of the second optical module and the third optical module comprises a light source and an optical phase sensor, and each of the second optical reference and the third optical reference is a reflection grating that reflects the light source's light to the optical phase sensor.

12. A lens driving apparatus with a closed-loop anti-shake structure, comprising:
- a lens holder comprising a coil;
- a frame comprising a plurality of magnets and receiving the lens holder;
- a driving circuit board comprising a plurality of coils corresponding to the plurality of magnets and disposed under the frame;
- a plurality of first set of elastic bodies configured such that the lens holder remains movable in a direction of a first axis with respect to the frame;
- a plurality of second set of elastic bodies configured such that the frame remains movable in a direction perpendicular to the first axis with respect to the driving circuit board; and
- a second optical module and a third optical module disposed at the driving circuit board, and a second optical reference and a third optical reference disposed at the frame, the second optical module sensing a relative movement of the second optical reference and the third optical module sensing a relative movement of the third optical reference so as to sense a movement of the frame in the direction perpendicular to the first axis,
- wherein the second optical module and the third optical module are disposed on a surface of the driving circuit board which is parallel to the first axis direction, the second optical reference and the third optical reference are disposed on the side surface of the frame which is parallel to the first axis direction, and the third optical module senses a distance between itself and the third optical reference and the second optical module senses a distance between itself and the second optical reference so as to sense the movement of the frame in the direction perpendicular to the first axis.

13. A lens driving apparatus with a closed-loop anti-shake structure, comprising:
- a lens holder comprising a coil;
- a frame comprising a plurality of magnets and receiving the lens holder;
- a driving circuit board comprising a plurality of coils corresponding to the plurality of magnets and disposed under the frame;
- a plurality of first set of elastic bodies configured such that the lens holder remains movable in a direction of a first axis with respect to the frame;
- a plurality of second set of elastic bodies configured such that the frame remains movable in a direction perpendicular to the first axis with respect to the driving circuit board; and
- a second optical module and a third optical module disposed at the driving circuit board, and a second optical reference and a third optical reference disposed at the frame, the second optical module sensing a relative movement of the second optical reference and the third optical module sensing a relative movement of the third optical reference so as to sense a movement of the frame in the direction perpendicular to the first axis,
- the lens driving apparatus further comprising a Hall sensor disposed on the lens holder and configured to sense a movement of the lens holder in the direction of the first axis.

14. A lens driving apparatus with a closed-loop anti-shake structure, comprising:
- a lens holder comprising a coil;
- a frame comprising a plurality of magnets and receiving the lens holder;
- a driving circuit board comprising a plurality of coils corresponding to the plurality of magnets and disposed under the frame;
- a plurality of first set of elastic bodies configured such that the lens holder remains movable in a direction of a first axis with respect to the frame;
- a plurality of second set of elastic bodies configured such that the frame remains movable in a direction perpendicular to the first axis with respect to the driving circuit board; and
- a second optical module and a third optical module disposed at the driving circuit board, and a second optical reference and a third optical reference disposed at the frame, the second optical module sensing a relative movement of the second optical reference and the third optical module sensing a relative movement of the third optical reference so as to sense a movement of the frame in the direction perpendicular to the first axis,
- the lens driving apparatus further comprising a first optical module and a first optical reference respectively disposed at the driving circuit board and the lens holder, the first optical module sensing a relative movement of the first optical reference so as to sense the movement of the lens holder in the direction of the first axis,
- wherein the first optical module comprises a light source and a light intensity sensor, and the first optical reference is a reflection mirror that reflects the light source's light to the light intensity sensor.

15. A lens driving apparatus with a closed-loop anti-shake structure, comprising:
- a lens holder comprising a coil;
- a frame comprising a plurality of magnets and receiving the lens holder;
- a driving circuit board comprising a plurality of coils corresponding to the plurality of magnets and disposed under the frame;
- a plurality of first set of elastic bodies configured such that the lens holder remains movable in a direction of a first axis with respect to the frame;
- a plurality of second set of elastic bodies configured such that the frame remains movable in a direction perpendicular to the first axis with respect to the driving circuit board; and
- a second optical module and a third optical module disposed at the driving circuit board, and a second optical reference and a third optical reference disposed at the frame, the second optical module sensing a relative movement of the second optical reference and the third optical module sensing a relative movement of the third optical reference so as to sense a movement of the frame in the direction perpendicular to the first axis, the lens driving apparatus further comprising a first optical module and a first optical reference respectively disposed at the frame and the lens holder, the first optical module sensing a relative movement of the first optical reference so as to sense the movement of the lens holder in the direction of the first axis.

16. The lens driving apparatus of claim 15, wherein the first optical module comprises a light source and an optical phase sensor, and the first optical reference is a reflection grating that reflects the light source's light to the optical phase sensor.

* * * * *